United States Patent [19]

Lad et al.

[11] Patent Number: 5,232,719
[45] Date of Patent: Aug. 3, 1993

[54] TYPE II ENDOGLYCOSIDASES IN BAKING FOR IMPROVING THE QUALITY OF DOUGH AND BAKED GOODS

[75] Inventors: Pushkaraj J. Lad, San Mateo; M. Margaret Mullins, El Granada, both of Calif.

[73] Assignee: Genencor International, Inc., So. San Francisco, Calif.

[21] Appl. No.: 997,630

[22] Filed: Dec. 28, 1992

Related U.S. Application Data

[63] Continuation of Ser. No. 714,574, Jun. 13, 1991, abandoned.

[51] Int. Cl.$^5$ ............................................... A21D 8/04
[52] U.S. Cl. ......................................... 426/20; 426/62
[58] Field of Search .................................. 426/20, 62

[56] References Cited

U.S. PATENT DOCUMENTS

| | | | |
|---|---|---|---|
| 3,512,992 | 5/1970 | Cooke et al. | 426/20 |
| 3,906,113 | 9/1975 | Belloc et al. | 426/20 X |
| 4,160,848 | 7/1979 | Vidal et al. | 426/20 X |
| 4,990,343 | 2/1991 | Haarasilta et al. | |
| 5,041,236 | 8/1991 | Carpenter et al. | 252/174.12 |

FOREIGN PATENT DOCUMENTS

0321811A1 6/1989 European Pat. Off.

*Primary Examiner*—Joseph Golian
*Attorney, Agent, or Firm*—Margaret A. Horn

[57] ABSTRACT

A method of improving dough characteristics is provided which includes the steps of mixing dough with a Type II endoglycosidase to form a dough mixture, shaping the dough mixture, and baking the said shaped dough mixture to form a baked good. The method of the present invention preferably uses endoglycosidase H mixed with bread dough which imparts better make-up performance of the dough, superior crumb qualities, softness of bread and higher loaf volumes.

24 Claims, No Drawings

TYPE II ENDOGLYCOSIDASES IN BAKING FOR IMPROVING THE QUALITY OF DOUGH AND BAKED GOODS

This is a continuation of application Ser. No. 714,574 filed Jun. 13, 1991, now abandoned.

FIELD OF THE INVENTION

The present invention relates to the use of endoglycosidase in baking for improving the characteristics of baked goods. More particularly, the present invention involves the use of Type II endoglycosidases in baking to impart superior crumb qualities, and to improve make up performance in dough, softness of bread, and volume.

BACKGROUND OF THE INVENTION

The "Straight Dough" and the "Pre-Ferment" methods are two major conventional methods for the manufacture of yeast raised bread products.

For the Straight Dough method, all of the flour, water or other liquid, and other ingredients which may include, but are not limited to yeast, grains, salt, shortening, sugar, yeast nutrients, dough conditioners, and preservatives are blended to form a dough and are mixed to partial or full development. The resulting dough is allowed to ferment for a period of time ranging from 0 to 6 hours or more depending upon specific process or desired end-product characteristics. For example, "no-time" processing may call for virtually no fermentation time, or just enough time to convey the dough mass to the next processing stage. "Short-time" processing may require a somewhat longer fermentation (i.e., 10–60 minutes). "Long-time" processing may require fermentation times over 60 minutes to achieve desired results.

The next step in the process is the mechanical or manual division of the dough into appropriate size pieces of sufficient weight to ensure achieving the targeted net weight after baking, cooling, and slicing. Some systems, particularly common with roll production, call for a continuous degassing step and possibly final developing step immediately prior to dividing. The dough pieces are often then rounded and allowed to rest (Intermediate Proof) for varying lengths of time. This allows the dough to "relax" prior to sheeting and molding preparations. The time generally ranges from 5–15 minutes, but may vary considerably depending on specific processing requirements and formulations.

The dough pieces are then mechanically or manually formed into an appropriate shape. This is often accomplished by passing the dough through one or more sets of sheeting rolls to flatten the dough piece, followed by a curling operation to form an elongated dough cylinder. Numerous variations of the molding operation exist. In some cases, doughs are processed through "string" lines in which long dough cylinders are then cut into portions which later become roll products. For pan bread, the molded dough pieces are transferred into greased pans. In the case of hearth bread, the dough pieces may be transferred onto screens, pans, sheets, or other appliances for further processing. The dough pieces are then given a final "proof" prior to baking. The times vary widely depending on process and desired finished product. Times may range from zero to several hours. Typical ranges for most wholesale pan bread and rolls is 40 to 60 minutes, 90°–100° F., and 85–95% relative humidity.

The dough pieces are then baked at various times, temperatures, and steam conditions in order to achieve the desired end product. Loaves are then often cooled for up to an hour or more prior to slicing (if desired) and packaging.

In the Pre-Ferment method, yeast is combined with other ingredients and allowed to ferment for varying lengths of time prior to final mixing of the bread or roll dough. Baker's terms for these systems include "Water Brew", "Liquid Ferment", "Liquid Sponge", and "Sponge/Dough". A percentage of flour ranging from 0–100% is combined with the other ingredients which may include but are not limited to water, yeast, yeast nutrients and dough conditioners and allowed to ferment under controlled or ambient conditions for a period of time. Typical times range from 1–5 hours. The ferment may then be used as is, or chilled and stored in bulk tanks or troughs for later use. The remaining ingredients are added (flour, characterizing ingredients, additional additives, additional water, etc.) and the dough is mixed to partial or full development.

The dough is then allowed to ferment for varying lengths of time. Typically, as some fermentation has taken place prior to the addition of the remaining ingredients, the time required is minimal (i.e., 10–20 minutes), however, variations are seen depending upon equipment and product type. Following the second fermentation step, the dough is then treated as in the Straight Dough Method. As used herein the term "dough" or "dough mixture" describes a pliable mixture that minimally comprises a flour or meal and a liquid, such as milk or water.

As used herein the term "dough ingredient" may include, but is not exclusive of, any of the following ingredients: flour, water or other liquid, grain, yeast, sponge, salt, shortening, sugar, yeast nutrients, dough conditioners and preservatives.

As used herein, the term "baked good" includes but is not exclusive of all bread types, including yeast-leavened and chemically-leavened and white and variety breads and rolls, english muffins, cakes and cookies, confectionery coatings, crackers, doughnuts and other sweet pastry goods, pie and pizza crusts, pretzels, pita and other flat breads, tortillas, pasta products, and refrigerated and frozen dough products.

The use of enzymes to improve dough characteristics in baking is well known in the art. For example, amylases are used to hydrolyze the $\alpha$-1,4-glycosidic linkages in polysaccharides, such as in starch granules. Alpha-amylases can attack long starch chains at random at their interior and can dextrinize and liquefy starch. The starch chains can then be further broken down by $\beta$-amylase into maltose and maltotriose. The use of amylases provides maltose for enhanced yeast fermentation and induces changes in dough characteristics, such as a decrease in water absorption capacity, a slackening of the dough, and the development of stickiness.

Alpha-amylases also exert an indirect effect on crust color by releasing sugar during the early stages of baking which causes crust browning. Alpha-amylase also brings about starch dextrinization during the early stages of baking, which results in an improved grain and a softer texture.

Alpha-amylases are endoglycosidases which are reactive with specific internal linkages within an oligo- or polysaccharide substrate. Such endoglycosidases are referred to herein as Type I endoglycosidases. Additional Type I endoglycosidases that have also been used in baking are cellulase, glucoamylase and pentosanase (also known as hemicellulase or arabinoxylanase).

Proteases have also been employed in baking to impart dough mellowing effects. Fungal proteases can be added to the sponge to allow the enzyme to act on flour proteins during the fermentation period that permits a reduction in dough mixing time, improved machinability, faster proofing due to better gas retention, and in loaves with better symmetry and improved grain and texture characteristics. *Baking Science and Technology,* Vol. 1, Pyler, E. J., Siebel Publishing Co., Chicago, Ill., pp. 132–182 (1988).

Other enzymes used in the baking industry include oxidoreductases such as lipoxygenase which catalyzes the coupled oxidation of carotene pigments of flour (thereby bleaching them) and of unsaturated fatty acids by atmospheric oxygen. The enzyme is used extensively by bakers to improve the whiteness of crumb color of bread. Pyler, et al. supra at p. 165; . Sumner, J. B., and Sumner, R. J., *J. Biol. Chem.* 134, 531 (1940).

As the demand for "natural foods" increases, the baking industry is searching for methods perceived as "natural" to obtain the softness, texture, whiteness and shelf-life characteristics of bread previously achieved by the use of additives such as emulsifiers, and other additives such as potassium bromate which is used as an oxidant for bread. Potassium bromate is used extensively as an improver for bakery flour. Bread bakers add it directly as a powder or tablet, or they may use it indirectly as an ingredient in yeast food and dough conditioners. Most of the bread produced in North America today has potassium bromate added in one form or another. Potassium bromate has several disadvantages in that when combined with combustible materials such as wheat flour, oil and grease it forms a highly flammable mixture that can ignite and explode if confined. In addition, ingestion of high levels of potassium bromate have been found to cause acute stomach cramps. *Food Chemical News,* p. 10, Jun. 1, 1989.

A "clean label" (i.e., a label free from ingredients viewed as "harmful chemicals" such as potassium bromate) is therefore highly desirable since the baking industry is searching for alternatives to the chemical additives they rely on currently. Enzymes are the natural additives that bakers will most likely turn to.

The use of enzymes that will impart better machinability characteristics to dough, such as better make-up performance (i.e., better dividing, rounding and molding characteristics), and will result in bread with finer and whiter crumb quality and softer texture, will be useful in the baking industry.

Type II endoglycosidases, as used herein, are a category of endoglycosidases which are capable of cleaving specific internal glycosidic linkages found in glycoproteins. These endoglycosidases cleave all or part of the carbohydrate moiety from a glycoprotein depending on the location of the reactive glycosidic linkage in the glycoprotein. Examples of Type II endoglycosidases include endo-$\beta$-N-acetylglucosaminidases (Endo-D, Endo-H, Endo-L, Endo-CI, Endo-CII, Endo-F-Gal type and Endo-F) endo-$\alpha$-N-acetylgalactosaminidase, endo-$\beta$-N-galactosidases, peptide-N-(N-acetyl-$\beta$-glucosaminyl) aspergine amidase F (PNGaseF EC 3.5 1.52) and glycopeptide N-glycosidase (Peptide N-glycosidase EC 3.2.2.18). See, e.g., Tarentino, A. L., et al. *Biochem* 24, 4665–4671 (1985); Arakawa, M., et al., *J. Biochem.,* 76, 307–317 (1974); Plummer, T. H. et al., *J. Biochem.* 59, 10700–10704 (1984); Tarentino, A. L. et al., *Biochem and Biophys. Res. Comm.* 67, 455–462 (1975); Trimble, R. B. et al. *Anal. Biochem.* 141, 515–522 (1984); Tarentino, A. L., et al., *Methods in Enzymology,* 138, 770–778 (1987); Plummer, T.H., et al., *J. Biol. Chem.,* 256, 10243–10246 (1981); and "Glycoprotein and Proteoglycan Techniques" by J. G. Beeley, Chap. 6, pp. 153–300, Elsevier, Amsterdam, New York, Oxford (1985). In addition to having a specificity for the internal glycosidic linkages of glycoproteins, at least one endoglycosidase (endo-$\beta$-N-acetylglucosaminidase H, i.e., Endo-H) has also demonstrated a specificity which produces the cleavage of lipid-linked oligosaccharides (Chalifour, R .J. et al. *Archives of Biochem. and Biophys.* 229, 386–394 (1983)) and reportedly di-N-acetylchitobiose linkages in oligosaccharides and glycoproteins (Tarentino, A. L. et al. *J. Biol. Chem.,* 249, 811–817 (1974). Such Type II endoglycosidases, in general, have been used primarily for analytical purposes, e.g., the determination of protein or carbohydrate sequence and/or the structure and function of specific glycoproteins. See, e.g., Hsieh, P. et al. *J. Biol. Chem.,* 258, 2555–2561 (1983); and Geyar, R. et al., *Eur. J. Biochem.,* 143, 531–539 (1984).

Type II endoglycosidases, however, have not been used in baking to improve dough and baked goods.

SUMMARY OF THE INVENTION

It is an object herein to provide methods utilizing Type II endoglycosidases alone or in combination with other enzymes to improve dough machinability and baked goods characteristics such as finer crumb quality, whiter bread crumb quality, softness of the baked good, and higher loaf volume.

It is a further object herein to provide formulations containing Type II endoglycosidases useful in practicing such methods.

In accordance with the objects of the invention, methods are provided for improving dough characteristics comprising the steps of mixing a Type II endoglycosidase with dough ingredients to form a dough mixture, and baking said dough mixture.

The Type II endoglycosidases used herein can include endoglycosidase H (Endo-H), or other endo-$\beta$-N-acetylglucosaminidases such as Endo-F, Endo-L, Endo-C, Endo-CII, Endo-F-Gal type, Endo-F, and PNGaseF. The type II endoglycosidase of the present invention can also include endo-$\alpha$-N-acetylgalactosaminidase and the endo-$\beta$-N-galactosidases.

DETAILED DESCRIPTION OF THE INVENTION

In the present invention, a method of improving bread dough characteristics is provided which lends better machinability characteristics to bread dough, allowing for better make-up performance, and resulting in bread with finer and whiter crumb quality. The method of the present invention also imparts softness to the bread and higher loaf volume.

In accordance with the objects of the invention, methods are provided for improving dough characteristics especially bread dough characteristics. Since every bread making process is different, there is no one particular standard or best method for making bread and conditions vary according to ingredients and desired qualities. However a typical method with workable ranges which will improve the bread dough upon incorporation of a Type II endoglycosidase comprises the steps of mixing bread formula ingredients to full development with a Type II endoglycosidase to form a dough, allowing the dough to rest for about 0 to 60 minutes at about 4° C. to about 40° C. and about 50% to about 90% relative humidity, preferably for about 40 minutes at about 30° C. and about 75% relative humidity; scaling the dough into individual pieces of about 400–600 grams each, preferably about 430 grams each; proofing the dough pieces for about 0 to about 20 minutes, preferably for about 10 minutes prior to molding, at about 20° C. and 50% relative humidity, molding and panning the dough pieces, proofing the dough for about 0 minutes to about 90 minutes at about 20° C. to about 40° C. and about 70% to about 90% relative humidity, preferably for about 40 minutes to about 45 minutes at about 36° C., and about 92% relative humidity; and baking the dough at about 150° C. to about 350° C. for about 7 to 30 minutes, preferably at about 218° C. for approximately 18 minutes, to form bread.

The method for improving bread quality involves the use of a Type II endoglycosidase which is capable of cleaving all or part of a carbohydrate moiety from a glycoprotein. A preferred amount of the Type II endoglycosidase is from about 10 ppm to about 1,000 ppm. A preferred Type II endoglycosidase is Endo-H in a concentration of between about 25 ppm and about 100 ppm.

Other Type II endoglycosidases can be used which can be selected from the group consisting of Endo-F, Endo-L, Endo-CI, Endo-CII, Endo-F-Gal type, and PNGase. Additional Type II endoglycosidases can be selected from the group consisting of endo-$\alpha$-N-acetyl galactosaminidase and endo-$\beta$-N-galactosidases. The method of the present invention can further include mixing bread dough with other enzyme preparations such as cellulase preparations containing arabinoxylanase in addition to the Type II endoglycosidase.

The Endo-H enzyme (EC 3.2.1.96) used in the examples herein was obtained commercially or from *E. coli* or *B. subtilis* hosts transformed to express Endo-H from *Streptomyces plicatus*.

Measurement of dough development and viscosity over time was performed by use of a farinograph. A farinograph is a physical dough-testing apparatus, used extensively by bakers and millers since the 1930's. The farinograph gives an indication of the relative mixing and absorption properties of the flour and any additives to be used in the bread formula. Tracings made by a farinograph are called a farinogram.

The following Examples are illustrative of the method of the present invention.

EXAMPLE 1

The Endo-H concentration in concentrated broth was 40 g/liter. Enzyme concentration was determined by using a standard enzyme preparation and assayed by using $\beta$-galactosidase labeled N-glycopeptide, (Boehringer Mannheim Biochemica, Indianapolis, Ind.). The standard was developed from enzyme with specific activity of 25 Units/mg. One unit is the amount of enzyme required to release 1 micromole of (3H)-dansyl-Asn-(Glc Nac)$_4$-(Man)$_6$ at pH 5.5 at 37° C. in 1 min (Tarentino et al., supra).

The constant dough weight method (AACC 54-21) was used. In this method, dough weight is kept constant at 480 grams. Hard red winter (HRW) patent wheat flour was used. The amounts of flour and water were adjusted accordingly. All doughs utilized 297.5 grams of flour and enough water plus enzyme to bring the total weight to 480.0 grams. This created a dough of approximately 61.35% absorption (not corrected to 14% moisture in flour).

Results of the data from the farinograms are presented in Table 1 below.

TABLE 1

| Treatment | Minutes | | | Brabender Units | |
|---|---|---|---|---|---|
| | DT | Stab. | PT | MTI | 20 min drop |
| flour control | 14.5 | 12.5 | 6.0 | 30 | 90 |
| 500 ppm Endo-H | 11.5 | 8.0 | 8.0 | 40 | 110 |

DT = departure time
Stab. = stability
PT = peak time
MTI = mixing tolerance index
Endo-H = endoglycosidase H The main objective of the farinogram curve is to achieve optimization on the 500 BU (Brabender unit) line (i.e., the industry standard correlated to best bake-out performance). A curve that peaks below the line is over-hydrated, a curve over the line is under-hydrated.

In this study, the control curve was optimized on the 500 line and absorption (% water in the dough) was not changed for any of the enzyme treatments to allow the curve to reflect any changes in water hydration properties caused by the treatments.

Departure time is the time required for the curve to leave the 500 line. The longer the DT, the stronger the flour. However, a decrease in viscosity during the running of the farinograph may result in a short DT as seen with the Endo-H treatment.

Stability of flour is indicated by several parameters: DT, MTI, stability and the 20 minute drop line. These values give an indication of the tolerance of the flour to the stresses of mixing. Less tolerant flours will have shorter DTs and stabilities, higher MTI values, and greater 20 minute drop lines. Another cause of "weakness" in farinogram stability values would be a drop in viscosity. Stability parameters were lower in the 500 ppm Endo-H treatment indicating a decrease in the viscosity of the dough.

Peak time (PT) is indicative of dough development time; how long it takes for the gluten to reach optimum elasticity. PT for the Endo-H treatment was increased, possibly indicating a strengthening effect on flour proteins.

The 20 minute drop line indicates the reduction in dough viscosity with time as seen in the Endo-H treatment.

In this example, the use of Endo-H reduced the viscosity and increased the time required for maximum elasticity to develop. Based on this apparent mellowing effect on the dough, it was theorized that extensibility and thus sheeting characteristics of the doughs would be improved by the addition of Endo-H.

EXAMPLE 2

A series of white bread test doughs were run to determine the effects of Endo-H. For these tests, a very basic liquid ferment white bread dough was used. The only other ingredients were flour, corn syrup, salt, shortening, dairy blend, yeast food, and oxidative additives (i.e., potassium bromate and iodate).

| Ingredients | Baker's Percent | Grains |
|---|---|---|
| *Base Formula* | | |
| Bread Flour | 100.0 | 640.0 |
| Liquid Ferment † | 29.7 | 190.0 |
| High Fructose Corn Syrup | 11.0 | 70.4 |
| Salt | 1.25 | 8.0 |
| Yeast Food (Brewloid) | 0.5 | 3.2 |
| Soy Oil | 3.0 | 19.2 |
| Dairy Blend | 3.0 | 19.2 |
| Water | 33.0 | 211.0 |
| *†Liquid Ferment Formula* | | |
| Water | 80% | |
| Compressed Yeast | 8.33% | |
| High Fructose Corn Syrup | 8.56% | |
| Brew Buffer | 0.38% | |
| Salt | 2.75% | |
| Total: | 100% | |

Test Doughs

1. Control=Above Formula
2. 100 ppm Endo-H* plus above formula
3. 500 ppm Endo-H* plus above formula

*Dough water was reduced in Tests 2 and 3 to compensate for liquid added by the enzyme preparation.

The test doughs as set forth above were mixed to full development, about 13 minutes. Floor time (i.e., rest time) was 40 minutes at 30° C. and 75% relative humidity. Doughs were scaled into 430 gram pieces. Intermediate proofing was for 10 minutes at ambient conditions prior to molding. Dough pieces were then sheeted, molded, and panned into 32 square inch pans. Proofing was done to a constant height (¾" above pan lip) at about 36° C. and 92% relative humidity. The doughs were then baked for 18 minutes at 218° C. The results are set forth in Table 2.

TABLE 2

| Test | Dough Feel After Mix | Ht. in Vessel After Floor time | Dough Feel at Makeup | Proof Time | Grain* Score | Loaf vol. | Softness** (24 hrs.) |
|---|---|---|---|---|---|---|---|
| 1 | Normal | 12.5 cm | Normal | 45 | 5 | 2200 | 5 |
| 2 | Normal | 13.5 cm | Slightly More Extensible | 42 | 7 | 2300 | 7 |
| 3 | Slightly Sticky | 10.0 cm | Sticky | 41 | 9 | 2450 | 9 |

*1 = Poor
10 = Excellent
**1 = Firm
10 = Soft

It was noted that at 500 ppm, Endo-H produced a dough which rose less in the fermentation vessel, and had a very shiny, wet surface. Proof was normal indicating good fermentation. Loaf volume was higher than the control, and grain was nearly perfect. The texture, or silkiness of the grain was similar to what one would expect in a sponge/dough for this base formula with no emulsifiers or conditioners.

At 100 ppm Endo-H, rise in the fermentation vessel was normal, and make-up was good. Loaf volume was higher than the control, but less than the 500 ppm test. The grain was nearly as good as the 500 ppm test.

Thus, use of Endo-H improved dough handling properties, such as extensibility and make-up performance, and allowed for improvements in loaf volume and final product quality.

EXAMPLE 3

A bread test dough is run to determine the effects of Endo-F. The formulas, baking conditions and procedures used in this example are identical to those in Example 2 except for the replacement of Endo-H with the enzyme Endo-F and a change in enzyme concentration level.

Test Doughs

1. Control=Base and Liquid Ferment Formulas same as in Example 2.
2. Test Above formula plus 50 ppm Endo-F.

The feel of the Test dough is slightly more extensible than the Control and proofs to the same height as the Control, but in slightly less time. Loaf volume for the Test bread is higher than the control and the grain and crumb quality of the Test bread is better in comparison to the Control.

EXAMPLE 4

The effects of PNGaseF on dough and bread quality are studied in this example. The formulas, baking conditions and procedures used herein again are the same as those disclosed in Example 2 except for the replacement of Endo-H with the enzyme PNGaseF and a change in enzyme concentration.

Test Doughs

1. Control=Base and Liquid Ferment Formulas same as in Examples 2 and 3.
2. Test=50 ppm PNGaseF plus above formula.

The Test dough feels slightly softer and is more extensible than the control and the Test dough proofs to equal height of the Control in slightly less time.

The Test bread loaf volume is higher than the Control and the grain and crumb quality of the Test bread is better than the control in that the grain is smoother than the Control and the crumb is softer than the Control.

EXAMPLE 5

A series of white bread doughs, having the base formula set forth below, were tested qualitatively using a short time straight dough process to determine the effects of various doses of Endo-H to dough and bread quality. The dose range used was 0–1000 ppm Endo-H.

One kilogram of flour was used per dough. Each dough yielded three loaves of bread. The other ingredients were water, salt, sugar, yeast, shortening, and a commercial bread improver preparation (Serrol BF28 from Serrol Ingredients, Australia) containing emulsifiers, oxidants and enzymes. This commercial preparation does not contain type II endoglycosidase enzymes. The base formula and Endo-H concentrations were as follows:

| Base formula | grams |
|---|---|
| flour | 1000.0 |
| water | 620.0 |
| salt | 20.0 |
| sugar | 10.0 |
| yeast | 12.5 |
| shortening | 10.0 |
| bread improver | 12.5 |

Test Doughs
1. base formula (control)
2. base formula + 25 ppm Endo-H
3. base formula + 50 ppm Endo-H
4. base formula + 100 ppm Endo-H
5. base formula + 500 ppm Endo-H
6. base formula + 1000 ppm Endo-H
 —40 g formula water, to compensate for the softening effect of the Endo-H at this dose.

All ingredients were added to a high speed mixer (energy input set at 50mH) and mixed for 30 seconds on "slow" speed, 2.5 minutes on "fast" speed. As shown in Test 6, less liquid was utilized at this dosage to compensate for the greater softening effect of the Endo-H at the higher concentrations. Doughs were given 5 minutes rest out of the mixer at about 34° C. Scale weight was 480 g. After molding, the dough pieces were given an intermediate proof of 10 minutes at 34.5° C., molded again, panned, and set in the proofer for approximately 50–60 minutes, about 38° C. and 80–90% relative humidity. Loaves were proofed to constant height. The loaves were baked at 240° C. for 20 minutes.

The visual and tactile characteristics of the resultant doughs and loaves of bread were compared qualitatively. The qualitative testing indicated that Endo-H imparted favorable characteristics to white bread at all dose levels. The main characteristic was the softening effect on doughs. This allowed the doughs to mold-up better, which in turn produced a bread with finer crumb qualities which felt softer to the touch and appeared whiter to the eye. There was a dose response in the series of test doughs with the bread and dough in that the 25 ppm to 100 ppm Endo-H containing doughs gave the most favorable characteristics. The dough in Test 3 at 50 ppm Endo-H was determined to give the best results in that it produced a soft, pliable dough with no tackiness detected at the molder.

EXAMPLE 6

A series of tests was run in a short-time straight dough white bread formula. The purpose was to test the effects of combining a Type II endoglycosidase enzyme with a commercial cellulase preparation, such as Cytolasex ™ 300, on dough and bread quality. The cellulase preparation used in this example, Cytolase ™ 300, was obtained from Genencor International, South San Francisco, Calif. The base formula and procedure used were as follows:

| Base Formula | Baker's % |
|---|---|
| Bread flour | 100.0 |
| Water | 62.0* |
| Yeast | 3.0 |
| Shortening | 3.0 |
| Salt | 2.0 |
| Sugar | 6.0 |
| Hydrated Monoglyceride (40% mono) | 0.25 |
| NFDM (non-fat dry milk) | 2.0 |
| SSL (sodium stearoyl lactylate) | 0.375 |
| Ascorbic acid | 100 ppm* |
| Potassium Bromate | 25 ppm* |
| Ammonium Sulfate | 350 ppm* |

*Added as separate solutions (solution water is included in the absorption indicated above).

Absorption: same for all tests (i.e., 62% water)
Mix Time: 16 minutes
Floor Time: 20 minutes
Scaling Wt.: 430 g for 32 in. pan
Bench Time: 10 minutes
Proof to ¾" above pan lip
Bake 425° F. for 18 minutes Test Doughs
1. Control: Base formula
2. Base formula + 100 ppm Endo-H
3. Base formula + 50 ppm cellulase preparation
4. Base formula + 100 ppm Endo-H + 50 ppm cellulase preparation
5. Base formula + 50 ppm Endo-H + 50 ppm cellulase preparation NOTE: The amount of water was reduced from some test formulas to compensate for the addition of the enzyme liquids.

Results

| Test | Dough Feel After Mix | Dough Feel at Make-up | Proof Time | Grain* Score | Loaf Volume | Softness** (24 hours) |
|---|---|---|---|---|---|---|
| 1 | Normal | Slightly Stiff | 54 | 7 | 2100 | 5 |
| 2 | Slightly Sticky Slightly More Extensible | Normal | 53 | 6.5 | 2150 | 6 |
| 3 | Slightly Sticky Slightly More Extensible | Normal | 52 | 7.5 | 2225 | 5 |
| 4 | Slightly Sticky Slightly More Extensible | Normal | 49 | 7.0 | 2225 | 7 |
| 5 | Slightly Sticky Slightly More Extensible | Normal | 49 | 8.0 | 2275 | 7 |

*1 = Poor
10 = Excellent
**1 = Firm
10 = Soft

All test doughs containing enzymes were more extensible than the control. Test Doughs 4 and 5, containing the mixture of enzymes, required slightly less proof time and had a slightly softer crumb 24 hours after baking than the other doughs. Loaf volume was also highest in test dough #5. The best results in terms of overall ease of makeup and finished product attributes was obtained from Test Dough #5 (50 ppm Endo-H+50 ppm cellulase preparation).

EXAMPLE 7

Endo-H is evaluated at 800 ppm in a chemically leavened whole wheat cracker formula set forth in Table 3 below. The Test dough formula in column 2 is the same as the Control dough formula in column 1 except for the addition of Endo-H.

The mix times are 4 minutes. The dough water is determined by feel for proper viscosity. The water in the formula includes 20 milliliters of water used to dissolve the ammonium bicarbonate. Floor time (dough rest time) is from about 30–90 minutes at room temperature and humidity in a stainless steel bowl, covered lightly with plastic wrap. Sheeting is done by hand with a rolling pin. The crackers are cut out, dockered, and salted by hand. The crackers are baked at 385° F. for 13 minutes. Following baking, oil is brushed on surfaces. The dough from Test formula 2, containing the Endo-H, is slightly more extensible than the Control dough (formula 1), allowing for easier sheeting. Thus, the crackers from Endo-H dough are more uniform in overall texture in comparison to crackers from the control dough.

TABLE 3

| Dough Ingredients | Test Formulas (grams) | |
| --- | --- | --- |
| | 1 | 2 |
| Whole Wheat Pastry Flour | 375.0 | 375.0 |
| Hard Whole Wheat Flour | 300.0 | 300.0 |
| Water | 300.0 | 300.0 |
| Wheat Gluten | 22.5 | 22.5 |
| Honey | 45.0 | 45.0 |
| Shortening | 60.0 | 60.0 |
| Sodium Bicarbonate | 6.0 | 6.0 |
| Ammonium Bicarbonate | 4.5 | 4.5 |
| Salt | 9.0 | 9.0 |
| Monocalcium Phosphate | 3.75 | 3.75 |
| Endo-H | — | 0.54 |
| Conditions | Test Units | |
| Dough Temperature | 92.0° F. | 92.0° F. |
| pH | 8.2 | 8.0 |
| Bake Time | 13 min. | 13 min. |

What is claimed is:

1. An improved yeast dough mixture, the improvement consisting essentially of adding to such dough mixture at least about 10 ppm of a Type II endoglycosidase.

2. A dough mixture of claim 1 wherein the Type II endoglycosidase is at least about 25 ppm 3. The dough mixture of claim 2 wherein the Type II endoglycosidase is from about 25 ppm to about 100 ppm.

4. The dough mixture of claim 2 wherein the Type II endoglycosidase is from about 50 ppm to about 100 ppm.

5. The dough mixture of claim 2 wherein the Type II endoglycosidase is from about 25 ppm to about 1000 ppm.

6. The dough mixture of claim 1 wherein the Type II endoglycosidase is selected from the group consisting of Endo-H, Endo-F, Endo-L, Endo-CI, Endo-CII, an Endo-F-Gal type and PNGase F.

7. The dough mixture of claim 6 wherein the Type II endoglycosidase is Endo-H.

8. The dough mixture of claim 7 wherein the Endo-H is present in an amount of between about 25 ppm and 1000 ppm.

9. The dough mixture of claim 1 further comprising a cellulase.

10. A method of improving the characteristics of a yeast dough or baked good made from such dough consisting essentially of the steps:
(a) mixing at least about 10 ppm of a Type II endoglycosidase with dough ingredients to form a dough mixture, and
(b) baking said dough mixture to form a baked good.

11. The method of claim 10 wherein the Type II endoglycosidase comprises Endo-H.

12. The method of claim 11 wherein the Endo-H comprises between about 25 ppm and about 1000 ppm.

13. The method of claim 10 wherein the Type II endoglycosidase is selected from the group consisting of Endo-F, Endo-L, Endo-C, Endo-CII, Endo-F-Gal type, and PNGase.

14. The method of claim 10 wherein the Type II endoglycosidase is selected from the group consisting of endo-$\beta$-N-acetylglucosaminidase, endo-$\alpha$-N-acetylgalactosaminidase and endo-$\beta$-N-galactosidase.

15. The method of claim 10 wherein cellulase is mixed with the dough ingredients in step (a).

16. A method of improving yeast bread dough or yeast roll dough or yeast bread or yeast roll characteristics consisting essentially of the steps:
(a) mixing at least about 10 ppm of a Type II endoglycosidase with bread or roll dough ingredients to form a dough mixture;
(b) shaping or panning the dough mixture;
(c) proofing the dough mixture, and
(d) baking the dough mixture to form bread or rolls.

17. The method of claim 16 wherein the Type II endoglycosidase is selected from the group consisting of Endo-H, Endo-F, Endo-L, Endo-CI, Endo-CII, Endo-F-Gal type, Endo-F, and PNGase.

18. A method of improving yeast bread dough or yeast roll dough or yeast bread or yeast roll characteristics consisting essentially of the steps:
(a) mixing dough ingredients with at least about 10 ppm of a Type II endoglycosidase to form a dough mixture;
(b) allowing the dough mixture of step (a) to rest for between about 1 to 20 minutes at about 4° C. to 40° C.;
(c) shaping or panning the dough mixture;
(d) proofing the dough mixture a second time for between about 1 to about 90 minutes, and
(e) baking the dough mixture to form bread or rolls 19. A method of improving yeast dough characteristics consisting essentially of the steps:
(a) mixing at least about 10 ppm of a Type II endoglycosidase with a first portion of dough ingredients to form a sponge;
(b) allowing the sponge to ferment;
(c) mixing the sponge from step (b) with a second portion of dough ingredients to form a dough mixture, and
(d) baking the dough mixture to form bread or rolls.

20. A method for improving yeast dough characteristics consisting essentially of the steps:
(a) mixing at least about 10 ppm of a Type II endoglycosidase with a first portion of dough ingredients to form a sponge;
(b) allowing the sponge to ferment;

(c) mixing the sponge from step (b) with a second portion of dough ingredients to form a dough mixture;
(d) shaping or panning the dough mixture, and
(e) baking the dough mixture to form bread or rolls.

21. A method for improving bread yeast dough characteristics consisting essentially of the steps:
   (a) mixing a first portion of dough ingredients to form a sponge;
   (b) allowing the sponge to ferment;
   (c) mixing the sponge with at least about 10 ppm of a Type II endoglycosidase and a second portion of dough ingredients to form a dough mixture;
   (d) shaping or panning the dough mixture from step (c), and
   (e) baking the dough mixture to form bread or rolls.

22. The method of claim 21 wherein the Type II endoglycosidase is Endo-H.

23. The method of claim 22 wherein the Endo-H is at least about 25 ppm in the dough mixture.

24. A method for improving bread yeast dough characteristics consisting essentially of the steps:
   (a) mixing a first portion of dough ingredients to form a sponge;
   (b) allowing the sponge to ferment;
   (c) mixing the sponge with at least about 10 ppm of a Type II endoglycosidase and a second portion of dough ingredients to form a dough mixture;
   (d) shaping or panning the dough mixture from step (c);
   (e) proofing the dough mixture, and
   (f) baking the dough mixture to form bread or rolls.

* * * * *